United States Patent
Chinnaswamy et al.

(10) Patent No.: US 6,611,526 B1
(45) Date of Patent: *Aug. 26, 2003

(54) SYSTEM HAVING A MESHED BACKPLANE AND PROCESS FOR TRANSFERRING DATA THERETHROUGH

(75) Inventors: Kumar Chinnaswamy, Westminster, MA (US); Paul H. Dormitzer, Acton, MA (US)

(73) Assignee: ADC Broadband Access Systems, Inc., Westborough, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/566,540

(22) Filed: May 8, 2000

(51) Int. Cl.⁷ .......................... H04L 12/28; H04L 12/50
(52) U.S. Cl. ...................... 370/406; 370/389; 370/369; 370/376
(58) Field of Search .................... 370/422, 426, 370/351, 406, 400–405, 423, 359, 362, 360, 369, 389, 419, 420, 222, 227, 223, 224, 257, 258, 242, 244, 421, 424; 709/201

(56) References Cited

U.S. PATENT DOCUMENTS

| | | | |
|---|---|---|---|
| 5,416,776 A | | 5/1995 | Panzarella et al. |
| 5,428,806 A | * | 6/1995 | Pocrass ............ 395/800 |
| 5,485,455 A | | 1/1996 | Dobbins et al. |
| 5,594,726 A | | 1/1997 | Thompson et al. |
| 5,615,211 A | * | 3/1997 | Santore et al. ............ 370/419 |
| 5,751,710 A | * | 5/1998 | Crowther et al. .......... 370/423 |
| 5,809,021 A | | 9/1998 | Diaz et al. |
| 5,812,771 A | * | 9/1998 | Fee et al. .................. 709/201 |
| 5,848,065 A | * | 12/1998 | Gorshe et al. ............. 370/376 |
| 5,875,309 A | * | 2/1999 | Itkowsky et al. .......... 710/113 |
| 5,885,213 A | | 3/1999 | Richardson et al. |
| 5,943,604 A | | 8/1999 | Chen et al. |
| 5,951,649 A | | 9/1999 | Dobbins et al. |
| 5,971,804 A | * | 10/1999 | Gallagher et al. .......... 439/581 |
| 5,987,069 A | | 11/1999 | Furukawa et al. |
| 6,014,380 A | | 1/2000 | Hendel et al. |
| 6,023,148 A | * | 2/2000 | Pignolet .................... 320/119 |
| 6,031,843 A | * | 2/2000 | Swanbery et al. ......... 370/426 |
| 6,151,628 A | | 11/2000 | Xu et al. |
| 6,154,465 A | | 11/2000 | Pickett |
| 6,289,405 B1 | * | 9/2001 | Movall et al. ............. 710/104 |
| 6,385,573 B1 | | 5/2002 | Gao et al. |
| 6,415,314 B1 | * | 7/2002 | Fee et al. .................. 709/201 |
| 6,549,700 B1 | * | 10/2002 | Hoang ....................... 370/401 |
| 6,553,568 B1 | | 4/2003 | Fijolek et al. |

FOREIGN PATENT DOCUMENTS

| | | |
|---|---|---|
| EP | 0 911 962 A1 | 4/1999 |
| EP | 0 949 832 A1 | 10/1999 |
| WO | WO 99/53652 | 10/1999 |

* cited by examiner

*Primary Examiner*—Kwang Bin Yao
*Assistant Examiner*—Hanh Nguyen
(74) *Attorney, Agent, or Firm*—Fogg and Associates, LLC; David N. Fogg; Laura A. Ryan

(57) ABSTRACT

A meshed backplane has dedicated pairs of connections for high-speed serial connection in each direction between each of multiple application modules and each other application module. A management/control bus is provided for out-of-band signaling. The mesh of serial differential pairs may be used for management/control bus signals when necessary. A time division multiplexing fabric is also provided for telephony applications. A star interconnect region is provided for distribution of signals from redundant clocks.

17 Claims, 17 Drawing Sheets

| Header Type | Keep | Fragment | Priority | Encap Type |
|---|---|---|---|---|
| Mcast Type | Dest FIA Type | Src FIA Type | Data Type | Forwarding Info |
| Dest FIA | Src FIA | | | |

Fig. 11

| BAS TYPE 1 OR 2 | KEEP | PRIORITY | FRAGMENT | NEXT HOP | ENCAP | MCAST | DST FIA TYPE | SRC FIA TYPE |
|---|---|---|---|---|---|---|---|---|
| BAS TLL | FOR-WARD INFO | DST/SRC FIA | | | | | | |

Fig. 14

Destination Slot

|    | 0  | 1  | 2  | 3  | 4  | 5  | 6  | 7  | 8  | 9  | 10 | 11 |
|----|----|----|----|----|----|----|----|----|----|----|----|----|
| 0  | 0  | 5  | 2  | 4  | 7  | 3  | 1  | 11 | 6  | 8  | 9  | 10 |
| 1  | 10 | 0  | 7  | 5  | 3  | 4  | 2  | 11 | 1  | 6  | 8  | 9  |
| 2  | 3  | 10 | 0  | 7  | 4  | 2  | 5  | 1  | 11 | 8  | 6  | 9  |
| 3  | 1  | 9  | 10 | 0  | 7  | 4  | 3  | 2  | 6  | 8  | 11 | 5  |
| 4  | 2  | 3  | 1  | 10 | 0  | 7  | 4  | 6  | 8  | 5  | 9  | 11 |
| 5  | 11 | 2  | 5  | 1  | 10 | 0  | 7  | 8  | 4  | 9  | 3  | 6  |
| 6  | 11 | 5  | 6  | 1  | 9  | 10 | 0  | 7  | 4  | 3  | 8  | 2  |
| 7  | 9  | 11 | 1  | 2  | 6  | 8  | 10 | 0  | 7  | 4  | 5  | 3  |
| 8  | 9  | 11 | 1  | 5  | 8  | 3  | 2  | 10 | 0  | 7  | 6  | 4  |
| 9  | 1  | 6  | 5  | 9  | 8  | 10 | 3  | 2  | 11 | 0  | 7  | 4  |
| 10 | 6  | 8  | 5  | 9  | 10 | 3  | 2  | 4  | 1  | 11 | 0  | 7  |
| 11 | 7  | 5  | 9  | 6  | 8  | 10 | 4  | 3  | 2  | 1  | 11 | 0  |

TRANSMIT CHANNELS (N SIDE)

*Fig. 15*

SYSTEM HAVING A MESHED BACKPLANE AND PROCESS FOR TRANSFERRING DATA THERETHROUGH

CROSS-REFERENCE TO RELATED APPLICATIONS

This application is related to co-pending applications Ser. No. 09/474,039, entitled, "System and Process for Direct, Flexible and Scalable Switching of Data Packets in Broadband Networks", filed Dec. 28, 1999 by the present applicants.

FIELD OF THE INVENTION

This invention relates generally to networking data processing systems, and, more particularly to a broadband network environment, for example, one using a SONET backbone and Hybrid Fiber-Coax(ial cable) ("HFC") to connect users to the backbone. An emerging hardware/software standard for the HFC environment is DOCSIS (Data Over Cable Service Interface Standard) of CableLabs.

BACKGROUND OF THE INVENTION

In a current configuration of wide-area delivery of data to HFC systems (each connected to 200 households/clients), the head-end server is connected to a SONET ring via a multiplexer drop on the ring (see FIG. 1). These multiplexers currently cost some $50,000 in addition to the head-end server, and scaling up of service of a community may require new multiplexers and servers.

The failure of a component on the head-end server can take an entire "downstream" (from the head-end to the end-user) sub-network out of communication with the world. Attempts have been made to integrate systems in order to reduce costs and to ease system management. A current integrated data delivery system is shown in FIG. 2. FIG. 2 shows a system having a reverse path monitoring system, an ethernet switch, a router, modulators and upconverters, a provisioning system, telephony parts, and a plurality of CMTS's (cable modem termination systems). This type of system typically has multiple vendors for its multiple systems, has different management systems, a large footprint, high power requirements and high operating costs.

A typical network broadband cable network for delivery of voice and data is shown in FIG. 3. Two OC-12 port interface servers are each connected to one of two backbone routers which are in turn networked to two switches. The switches are networked to CMTS head-end routers. The CMTS head-end routers are connected to a plurality of optical nodes. The switches are also connected to a plurality of telephone trunk gateways which are in turn connected to the public switched telephone network (PSTN). As with the "integrated" system shown in FIG. 2, this type of network also typically has multiple vendors for its multiple systems, has different management systems, a large footprint, high power requirements and high operating costs.

In order to facilitate an effective integrated solution, an integrated electrical interconnect system is needed that provides the bandwidth and routing capability for delivery of voice and data in a compact area.

Problems of integration include difficulties in circuit routing in a complex system, maintaining flexibility in arrangement and type of components, managing data flow control, limiting component size and number and limiting cost.

It is desirable to have an integrated solution to reduce the size of the system, its power needs and its costs, as well as to give the data delivery system greater consistency.

It is an object of the present invention to provide a system and process for electrical interconnect for broadband delivery of high-quality voice, data, and video services.

It is another object of the present invention to provide a system and process for a cable access platform having high network reliability with the ability to reliably support lifeline telephony services and the ability to supply tiered voice and data services.

It is another object of the present invention to provide a system and process for a secure, scalable network switch.

SUMMARY OF THE INVENTION

The problems of providing the bandwidth and routing capability for delivery of voice and data in a compact area for an integrated switch are solved by the present invention of a meshed backplane.

The meshed backplane has dedicated pairs of connections for high-speed serial connection in each direction between each of multiple application modules and each other application module. A management/control bus is provided for out-of-band signaling. The mesh of serial differential pairs may be used for management/control bus signals when necessary. A time division multiplexing fabric is also provided for telephony applications. A star interconnect region is provided for distribution of signals from redundant clocks.

The present invention together with the above and other advantages may best be understood from the following detailed description of the embodiments of the invention illustrated in the drawings, wherein:

BRIEF DESCRIPTION OF THE DRAWINGS

FIG. 11 is a block diagram of a generic switch packet header;

FIG. 14 is a block diagram of a header for the ICL packet of FIG. 13;

FIG. 15 shows example mapping tables mapping channels to backplane slots according to principles of the present invention;

DETAILED DESCRIPTION OF PREFERRED EMBODIMENTS

Figure 1:
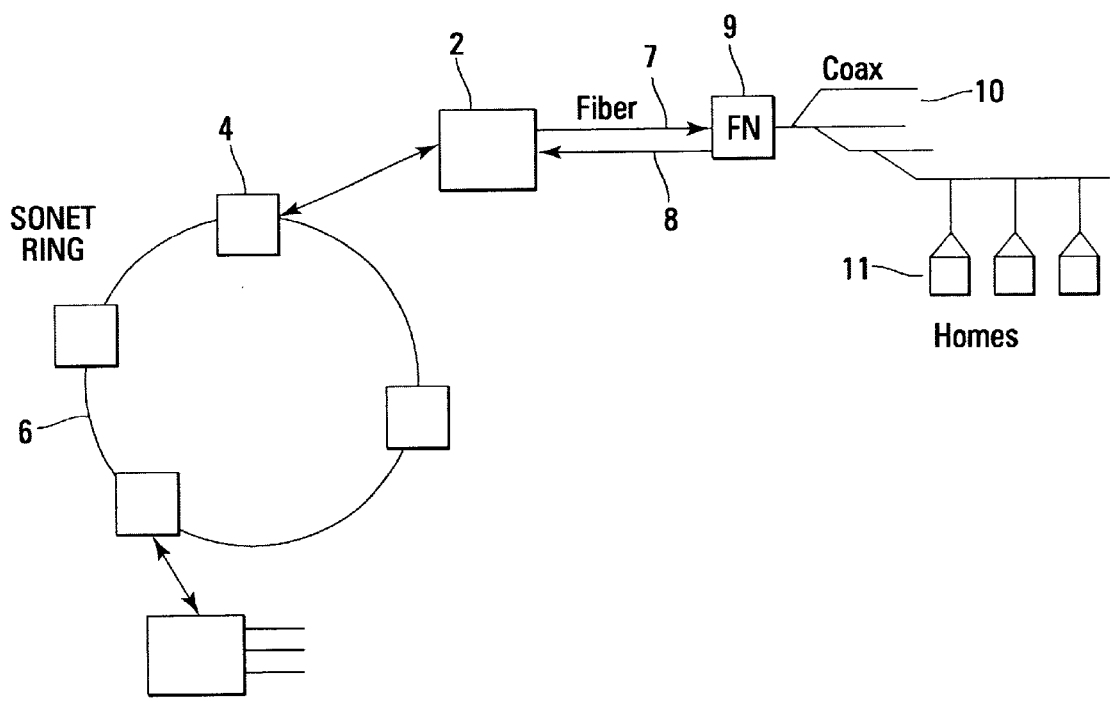
FIG. 1 shows a prior art network on a SONET ring.
Figure 2:
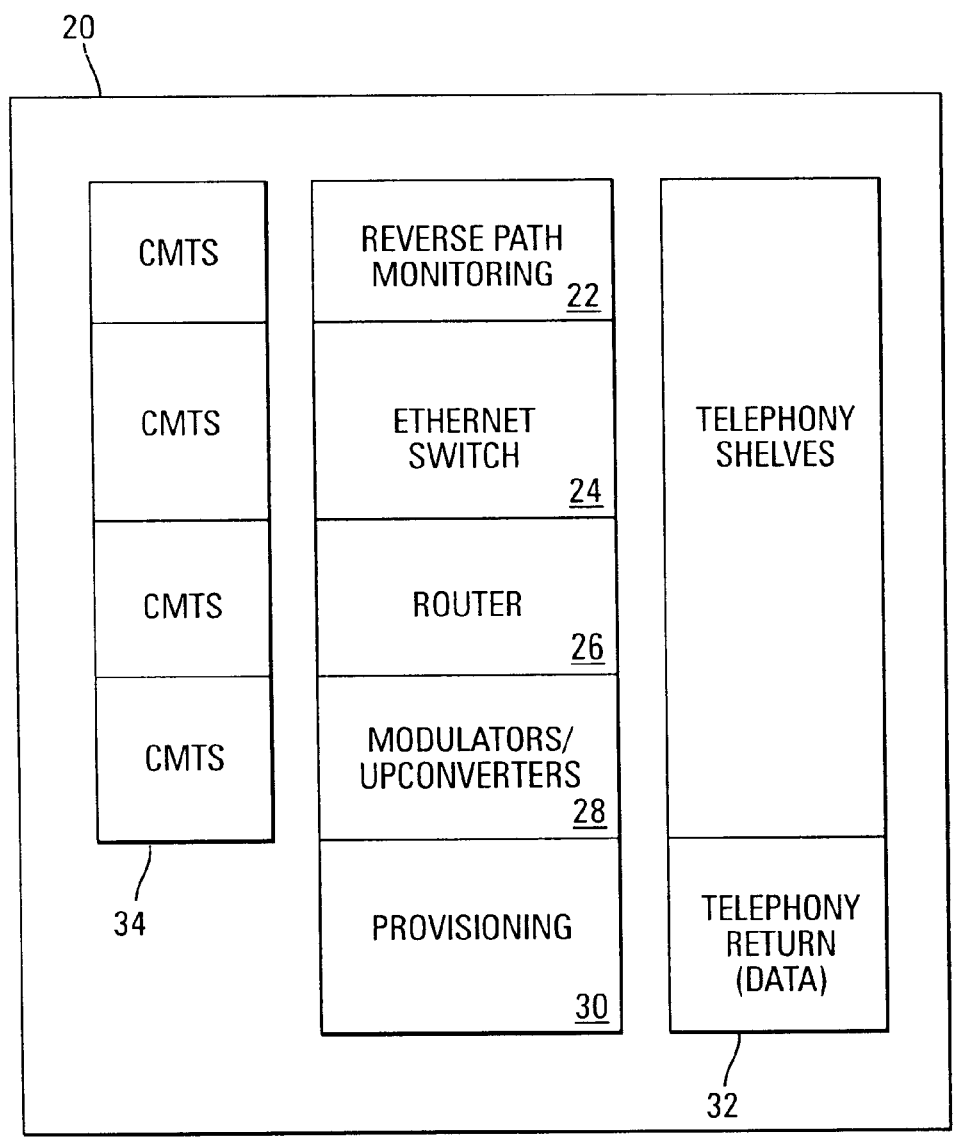
FIG. 2 shows a prior art data delivery system.
Figure 3:
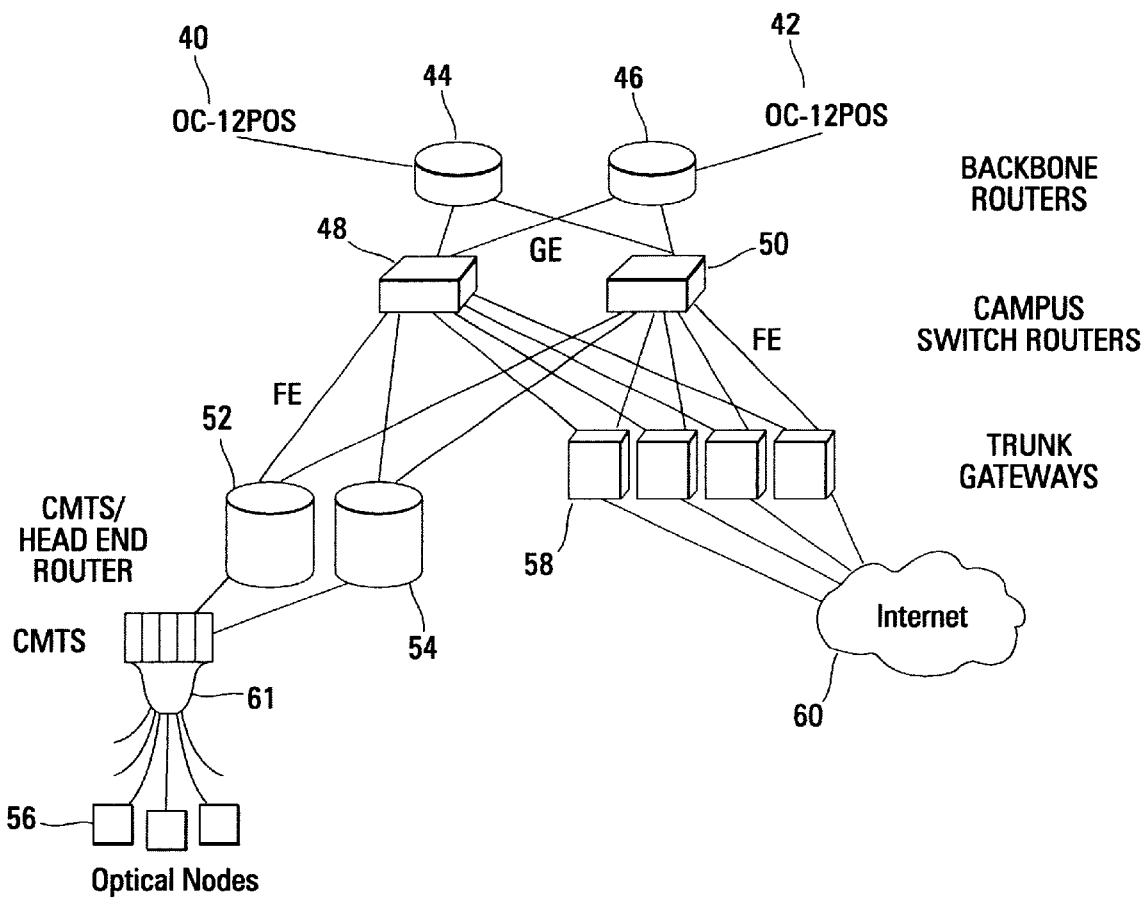
FIG. 3 shows a prior art data delivery network.
Figure 4:
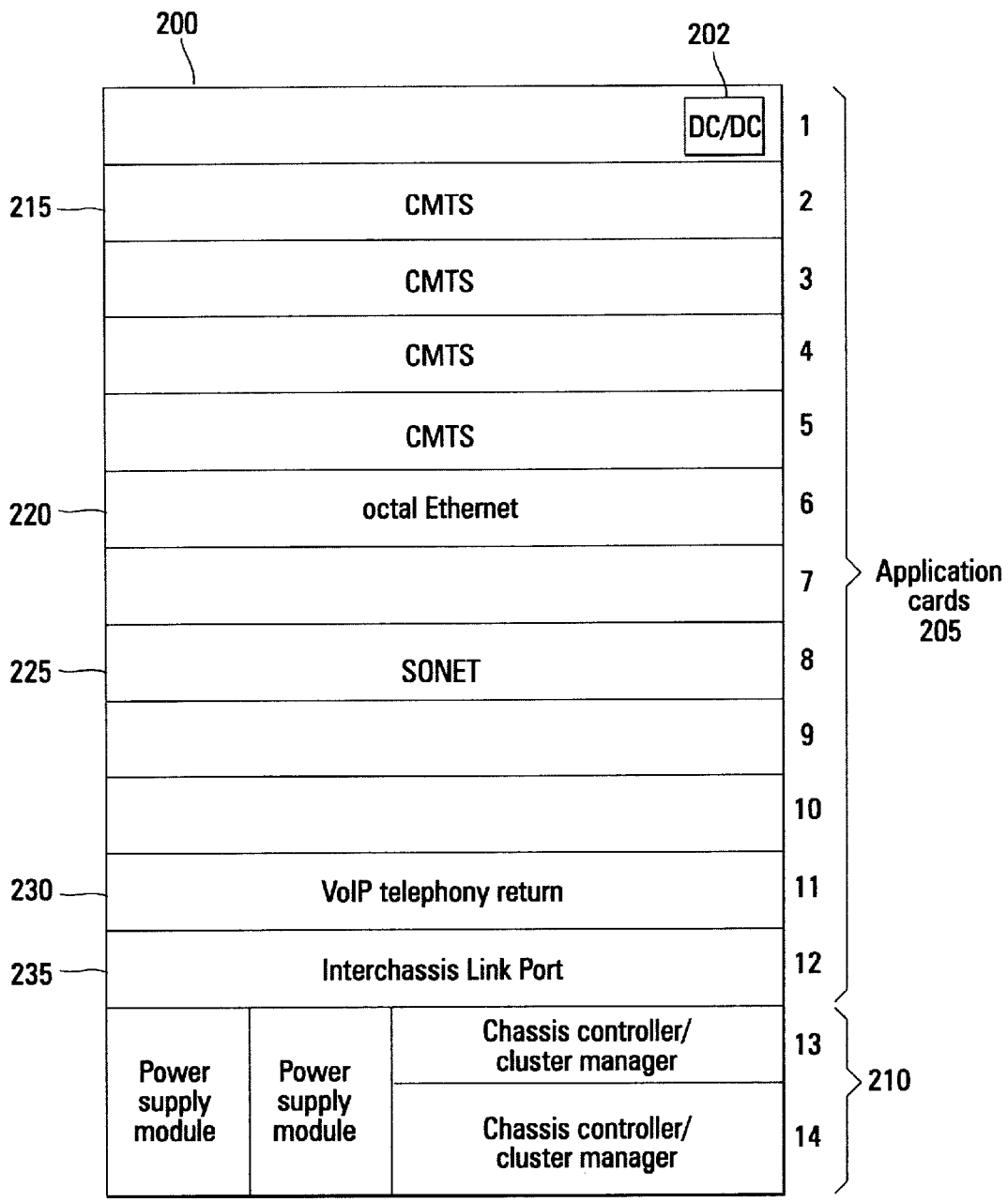
FIG. 4 is a block diagram of a chassis according to principles of the invention.

FIG. 4 shows a chassis 200 operating according to principles of the present invention. The chassis 200 integrates a plurality of network applications into a single switch system. The invention is a fully-meshed OSI Layer 3/4 IP-switch with high performance packet forwarding, filtering and QoS/CoS (Quality of Service/Class of Service) capabilities using low-level embedded software controlled by a cluster-manager in a chassis controller. Higher-level software resides in the cluster manager, including router server functions (RIPv1, RIPv2, OSPF, etc.), network management (SNMP V1/V2), security, DHCP, LDAP, and remote access software (VPNS, PPTP, L2TP, and PPP), and can be readily modified or upgraded.

In the present embodiment of the invention, the chassis 200 has fourteen (14) slots for modules. Twelve of those fourteen slots hold application modules 205, and two slots hold chassis controller modules 210. Each application module has an on-board DC-DC converter and is "hot-pluggable" into the chassis. The chassis controller modules 210 are for redundant system clock/bus arbitration. Examples of applications that may be integrated in the chassis are a CMTS module 215, an Ethernet module 220, a SONET module 225, and a telephony application 230. Another application may be an interchassis link (ICL) port 235 through which the chassis may be linked to another chassis.

Figure 5:
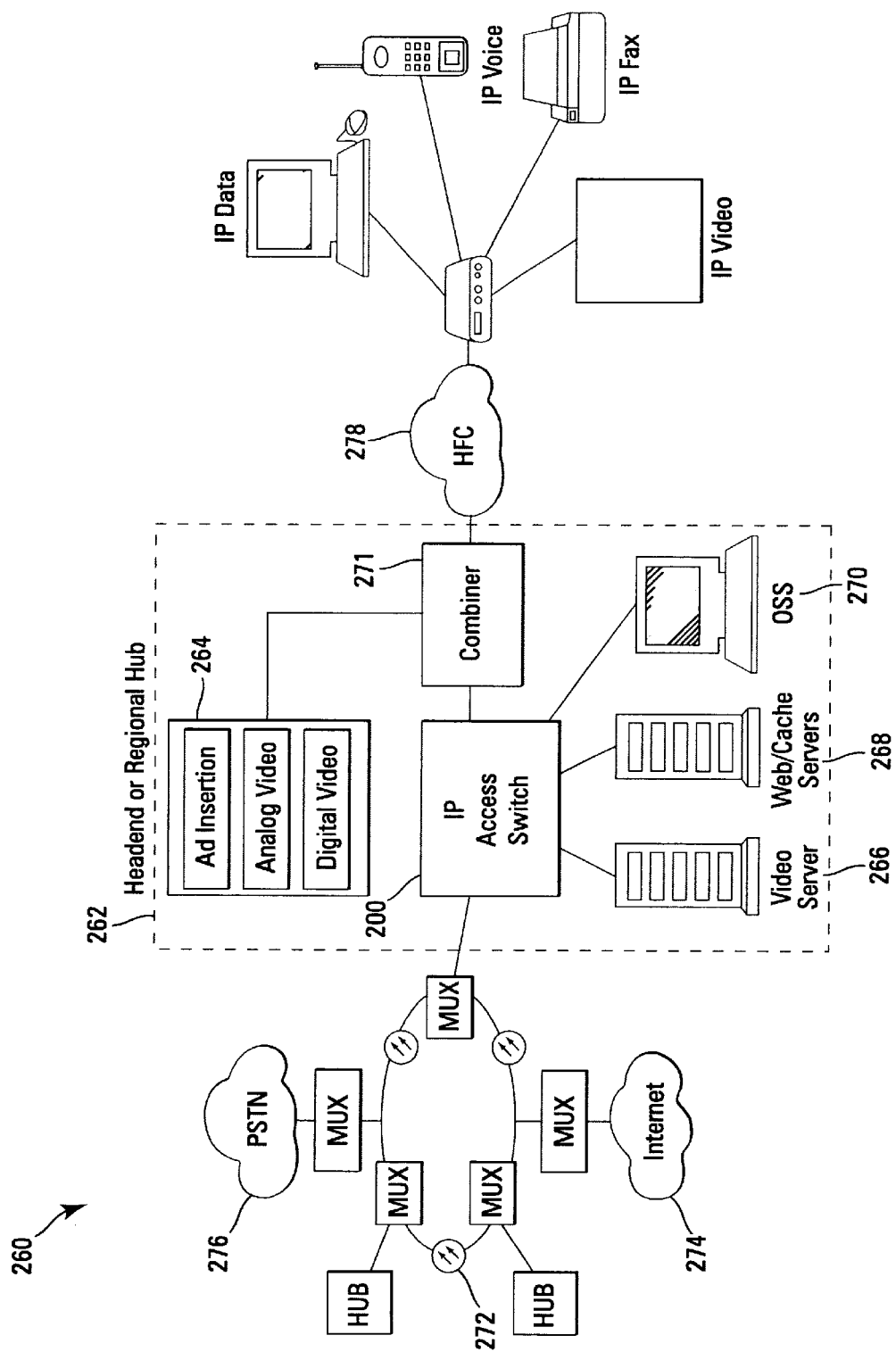
FIG. 5 shows an integrated cable infrastructure having the chassis of FIG. 4.

FIG. 5 shows an integrated cable infrastructure 260 having the chassis 200 of FIG. 4. The chassis 200 is part of a regional hub 262 (also called the "head-end") for voice and data delivery. The hub 262 includes a video controller application 264, a video server 266, Web/cache servers 268, and an operation support system (OSS) 270, a combiner 271 and the chassis 200. The chassis 200 acts as an IP access switch. The chassis 200 is connected to a SONET ring 272, outside the hub 262, having a connection to the Internet 274, and a connection to the Public Switched Telephone Network (PSTN) 276. The chassis 200 and the video-controller application 264 are attached to the combiner 271. The combiner 271 is connected by an HFC link 278 to cable customers and provides IP voice, data, video and fax services. At least 2000 cable customers may be linked to the head-end by the HFC link 278. The chassis 200 can support a plurality of HFC links and also a plurality of chassises may be networked together (as described below) to support thousands of cable customers.

By convention today, there is one wide-band channel for transmission (downloading) to users (which may be desktop computers, facsimile machines or telephone sets) and four much narrower channels for (uploading). This is processed by the HFC cards with duplexing at an O/E node. The local HFC cable system or loop may be a coaxial cable distribution network with a drop to a cable modem.

Figure 6:
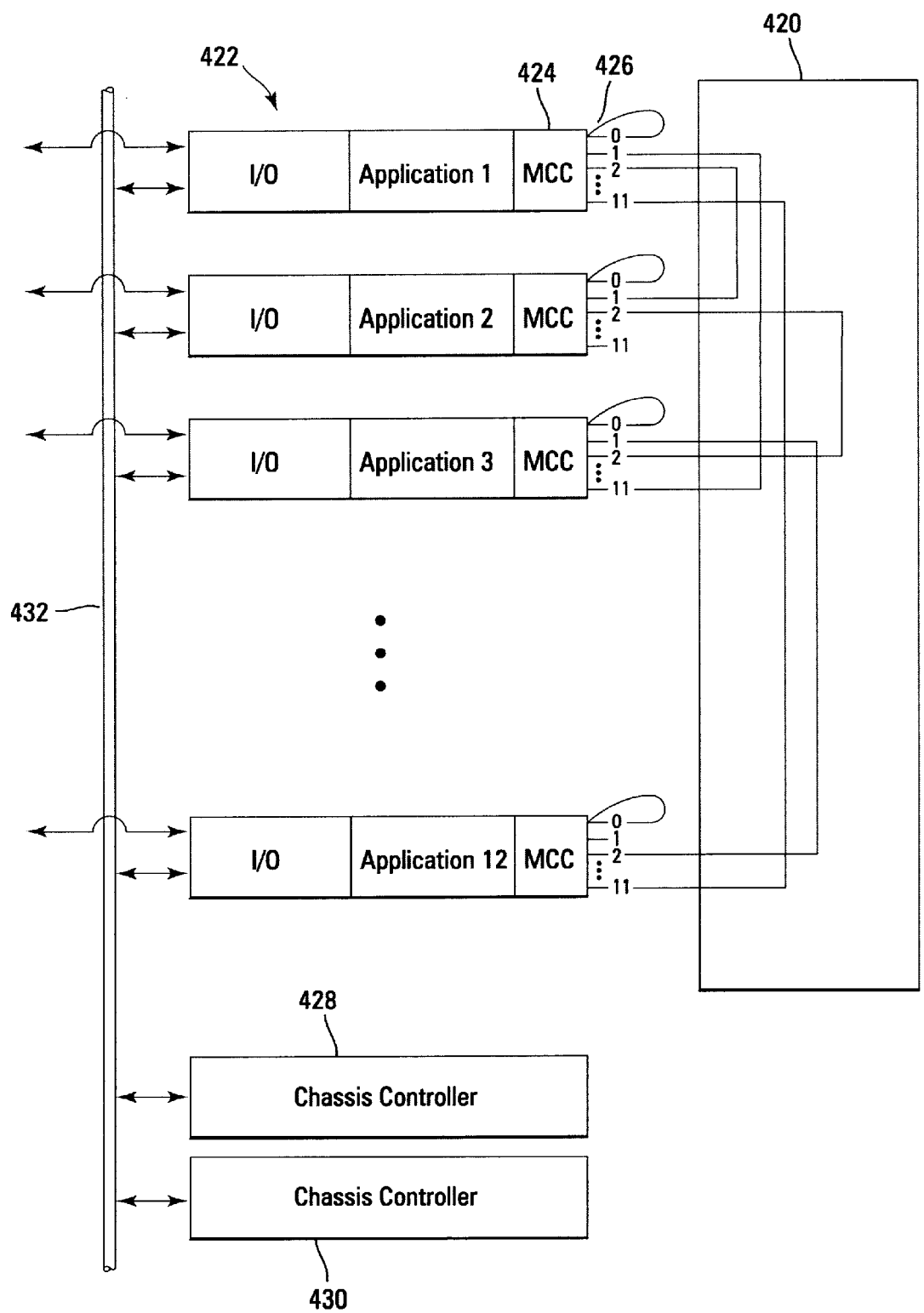
FIG. 6 is a block diagram of the application cards, the backplane and a portion of the interconnections between them in the chassis of FIG. 4.
Figure 7:
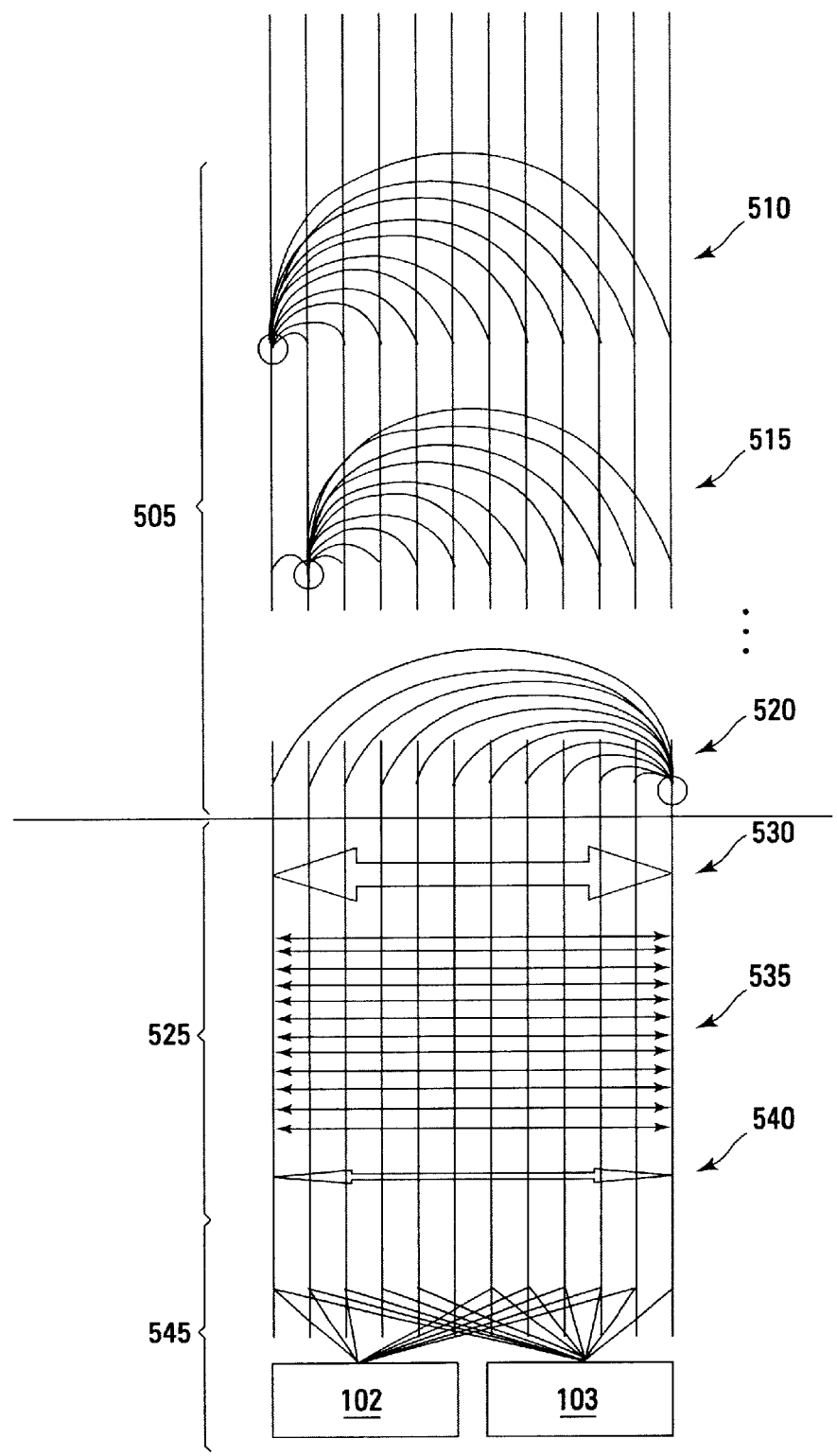
FIG. 7 is a schematic diagram of the backplane interconnections, including the switching mesh.

FIG. 6 shows application modules connected to a backplane 420 of the chassis 200 of FIG. 4. In the present embodiment of the invention, the backplane is implemented as a 24-layer printed wiring board and includes 144 pairs of uni-directional differential-pair connections, each pair directly connecting input and output terminals of each of a maximum of twelve application modules with output and input terminals of each other module and itself. Each application module interfaces with the backplane through a Mesh Communication Chip (MCC) 424 through these terminals. Each application module is also connected to a chassis management bus 432 which provides the modules with a connection to the chassis controllers 428, 430. Each MCC 424 has twelve (12) serial link interfaces that run to the backplane 420. Eleven of the serial links on each application module are for connecting the application module to every other application module in the chassis. One link is for connecting the module with itself, i.e., a loop-back. The backplane is fully meshed meaning that every application module has a direct link to every other application module in the chassis through the serial links. Only a portion of the connections is shown in FIG. 6 as an example. The backplane mesh is shown in FIG. 7.

The 12 channels with serial links of the MCC are numbered 0 to 11. This is referred to as the channel ID or CID. The slots on the backplane are also numbered from 0 to 11 (slot ID, or SID). The chassis system does not require, however, that a channel 0 be wired to a slot 0 on the backplane. A serial link may be connected to any slot. The slot IDs are dynamically configured depending on system topology. This provides freedom in backplane wiring layout which might otherwise require layers additional to the twenty-four layers in the present backplane. The application module reads the slot ID of the slot into which it is inserted. The application module sends that slot ID out its serial lines in an idle stream in between data transmissions. The application module also includes the slot ID in each data transmission.

FIG. 15 shows examples of mapping tables of channels in cards to backplane slots. Each card stores a portion of the table, that is, the table row concerning the particular card. The table row is stored in the MCC.

Figure 16:
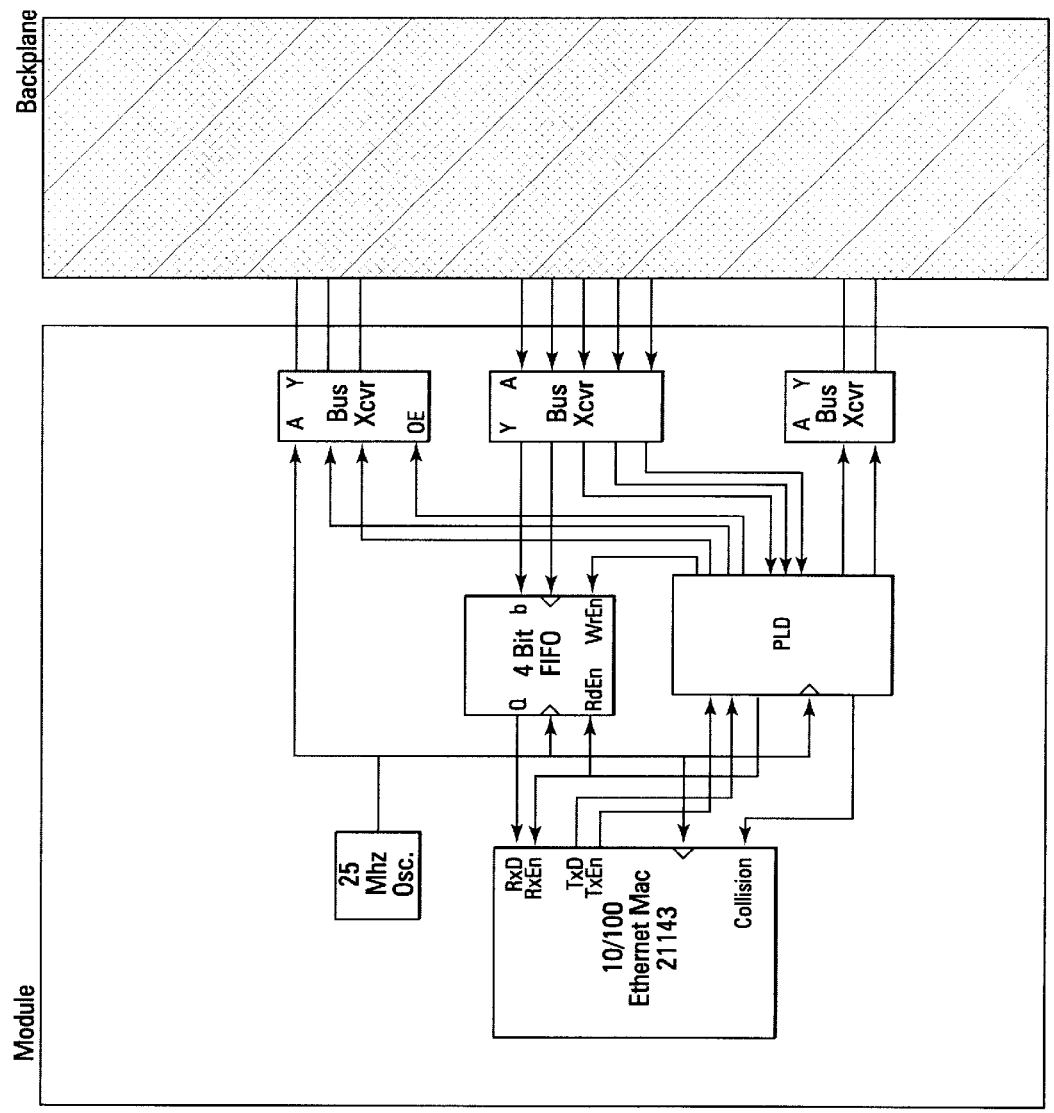
FIG. 16 is a block diagram of a bus arbitration application module connected in the backplane of the present invention.

FIG. 16 shows a management bus arbitration application module connected to the backplane. The backplane contains two separate management buses for failure protection. Each application module in the chassis including the two chassis controllers as well as the twelve applications modules can use both or either management bus.

The management bus is used for low-speed data transfer within the chassis and generally consists of control, statistical, configuration information, data from the chassis controller modules to the application modules in the chassis.

The implementation of the management bus consists of a four bit data path, a transmit clock, a transmit clock signal, a collision control signal, and a four bit arbitration bus. As seen in FIG. 16, the bus controller has a 10/100 MAC device, a receive FIFO, bus transceiver logics, and a programmable logic device ("PLD").

The data path on the management bus is a four-bit (Media Independent Interface) MII standard interface for 10/100 ethernet MACs. The bus mimics the operation of a standard 100 Mbit ethernet bus interface so that the MAC functionality can be exploited. The programmable logic device contains a state machine that performs bus arbitration.

Figure 17:
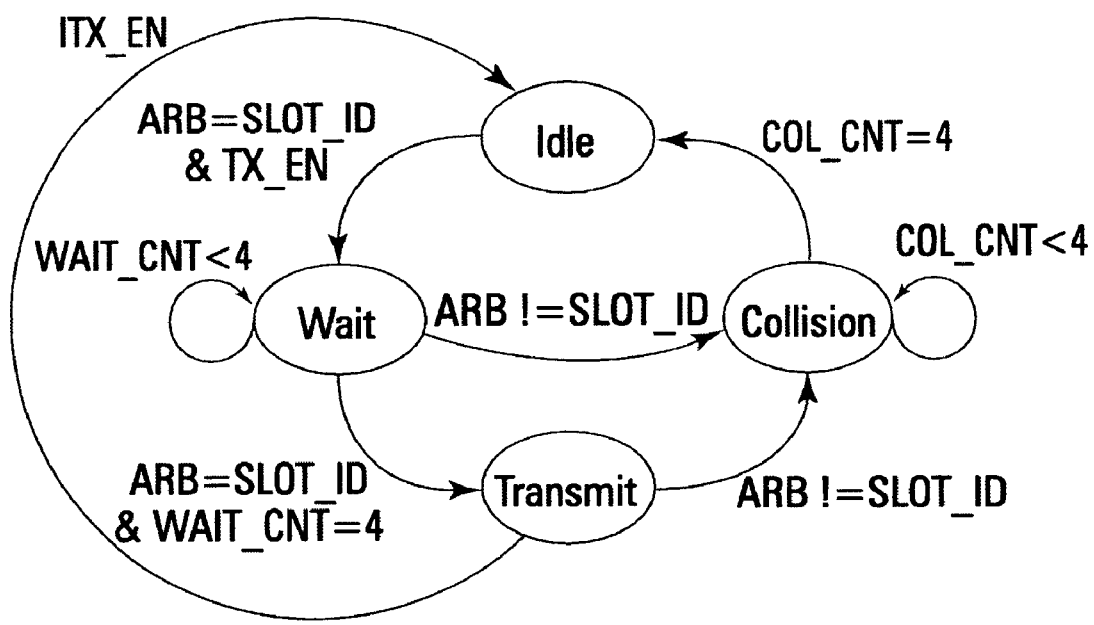
FIG. 17 is a state diagram of bus arbitration in the application module of FIG. 16.

FIG. 17 shows the state diagram for the state machine in the programmable logic device for the management bus. The arbitration lines determine which module has control of the bus by using open collector logic. The pull-ups for the arbitration bus reside on the chassis controller modules. Each slot places its slot ID on the arbitration lines to request the bus. During transmission of the preamble of data to be transmitted, if the arbitration is corrupted, the bus controller assumes that another slot had concurrently requested the bus and the state machine within the PLD aborts the transfer operation by forcing a collision signal for both the bus and the local MAC device active. As other modules detect the collision signal on the bus active, the collision line on each local MAC is forced to the collision state, which allows the back-off algorithm within the MAC to determine the next transmission time. If a collision is not detected, the data is latched into the receive FIFO of each module, and the TX_Enable signal is used to quantify data from the bus. The state machine waits four clock cycles during the preamble of the transmit state, and four clock cycles during the collision state to allow the other modules to synchronize to the state of the bus.

Backplane Architecture

Figure 8:
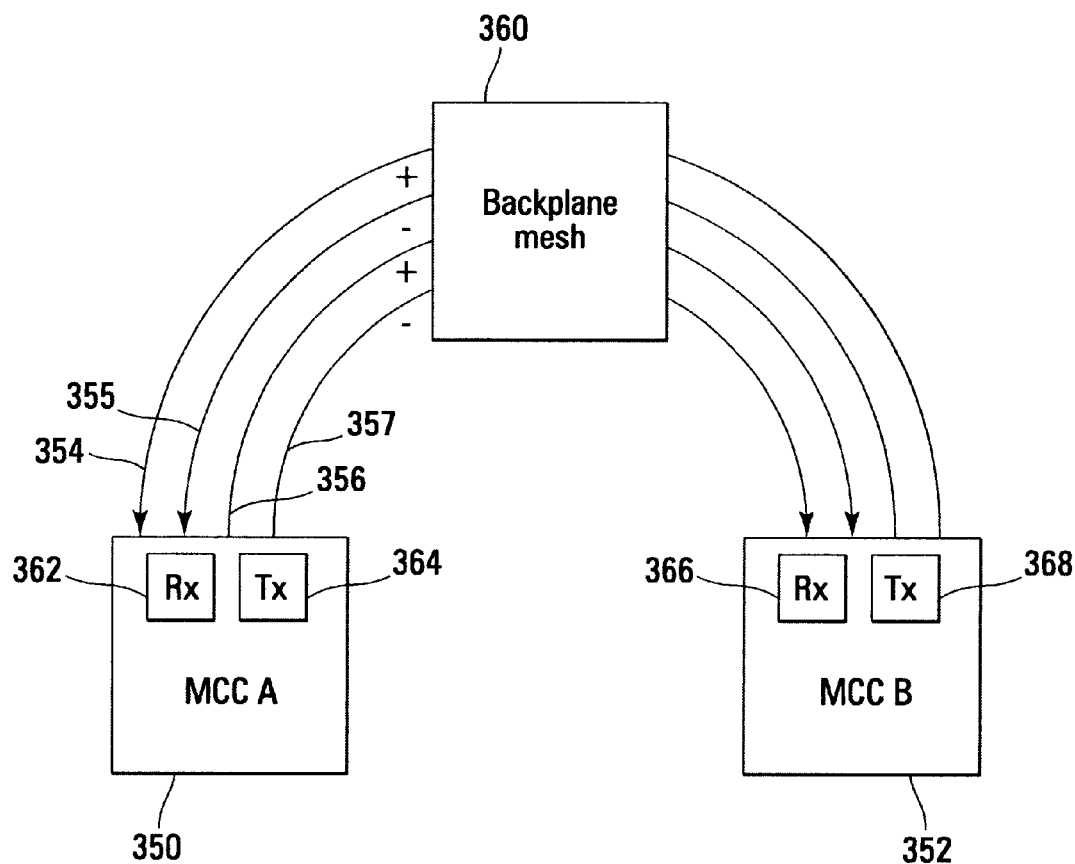
FIG. 8 is a block diagram of two exemplary slots showing differential pair connections between the slots.

FIG. 7 shows the internal backplane architecture of the current embodiment of the switch of the invention that was shown in exemplary fashion in FIG. 6. One feature is the full-mesh interconnection between slots shown in the region 505. Slots are shown by vertical lines in FIG. 7. This is implemented using 144 pairs of differential pairs embedded in the backplane as shown in FIG. 8. Each slot thus has a full-duplex serial path to every other slot in the system. There are n(n−1) non-looped-back links in the system, that is, 132 links, doubled for the duplex pair configuration for a total of 264 differential pairs (or further doubled for 528 wires) in the backplane to create the backplane mesh in the present embodiment of the invention. Each differential pair is able to support data throughput of more than 1 gigabit per second.

In the implementation of the current invention, the clock signal is embedded in the serial signaling, obviating the need for separate pairs (quads) for clock distribution. Because the data paths are independent, different pairs of cards in the chassis may be switching (ATM) cells and others switching (IP) packets. Also, each slot is capable of transmitting on all 11 of its serial links at once, a feature useful for broadcasting. All the slots transmitting on all their serial lines achieve a peak bandwidth of 132 gigabits per second. Sustained bandwidth depends on system configuration.

The mesh provides a fully redundant connection between the application cards in the backplane. One connection can fail without affecting the ability of the cards to communicate. Routing tables are stored in the chassis controllers. If, for example, the connection between application module 1 and application module 2 failed, the routing tables are updated. The routing tables are updated when the application modules report to the chassis controllers that no data is being received on a particular serial link. Data addressed to application module 2 coming in through application module 1 is routed to another application module, for instance application module 3, which would then forward the data to application module 2.

The bus-connected backplane region 525 includes three bus systems. The management/control bus 530 is provided for out-of-band communication of signaling, control, and management information. A redundant backup for a management bus failure will be the mesh interconnect fabric 505. In the current implementation, the management bus provides 32-bit 10–20 MHz transfers, operating as a packet bus. Arbitration is centralized on the system clock module 102 (clock A). Any slot to any slot communication is allowed, with broadcast and multicast also supported. The bus drivers are integrated on the System Bus FPGA/ASIC.

A TDM (Time Division Multiplexing) Fabric 535 is also provided for telephony applications. Alternative approaches include the use of a DSO fabric, using 32 TDM highways (sixteen full-duplex, 2048 FDX timeslots, or approximately 3 T3s) using the H.110 standard, or a SONET ATM (Asynchronous Transfer Mode) fabric.

Miscellaneous static signals may also be distributed in the bus-connected backplane region 540. Slot ID, clock failure and management bus arbitration failure may be signaled.

A star interconnect region 545 provides independent clock distribution from redundant clocks 102 and 103. The static signals on backplane bus 540 tell the system modules which system clock and bus arbitration slot is active. Two clock distribution networks are supported: a reference clock from which other clocks are synthesized, and a TDM bus clock, depending on the TDM bus architecture chosen. Both clocks are synchronized to an internal Stratum 3/4 oscillator or an externally provided BITS (Building Integrated Timing Supply).

FIG. 8 shows a first connection point on a first MCC on a first module, MCC A 350, and a second connection point on a second MCC on a second module, MCC B 352, and connections 354, 355, 356, 357 between them. The connections run through a backplane mesh 360 according to the present invention. There are transmit 362, 364 and receive 366, 368 channels at each MCC 350, 352, and each channel has a positive and a negative connection. In all, each point on a module has four connections between it and every other point due to the backplane mesh. The differential transmission line impedance and length are controlled to ensure signal integrity and high speed operation.

Figure 9:
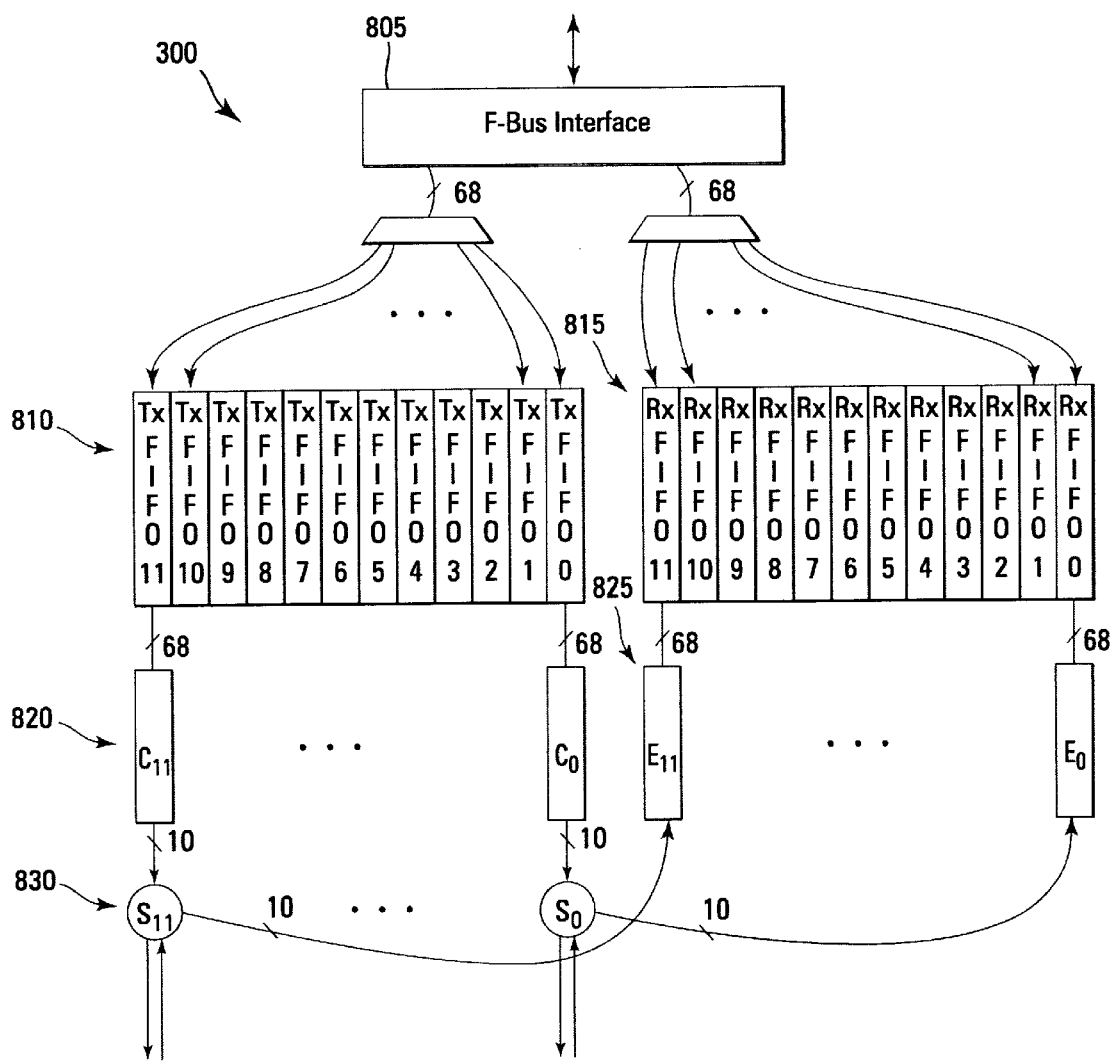
FIG. 9 is a block diagram of the MCC chip in an application module according to principles of the present invention.

FIG. 9 is a block diagram of the MCC chip. An F-bus interface 805 connects the MCC 300 to the FIFO bus (F-bus). Twelve transmit FIFOs 810 and twelve receive FIFOs 815 are connected to the F-bus interface 805. Each transmit FIFO has a data compressor (12 data compressors in all, 820), and each receive FIFO has a data expander (12 data expanders in all, 825). Twelve serializer/deserializers 830 serve the data compressors 820 and data expanders 825, one compressor and one expander for each A channel in the MCC is defined as a serial link together with its encoding/decoding logic, transmit queue and receive queue. The serial lines running from the channels connect to the backplane mesh. All the channels can transmit data at the same time. A current implementation of the invention uses a Mesh Communication Chip to interconnect up to thirteen F-buses in a full mesh using serial link technology. Each MCC has two F-bus interfaces and twelve serial link interfaces. The MCC transmits and receives packets on the F-buses in programmable size increments from 64 bytes to entire packets. It contains twelve virtual transmit processors (VTPs) which take packets from the F-bus and send them out the serial links, allowing twelve outgoing packets simultaneously. The VTPs read the MCC tag on the front of the packet and dynamically bind themselves to the destination slot(s) indicated in the header.

The card/slot-specific processor, card/slot-specific MAC/PHY pair (Ethernet, SONET, HFC, etc.) and an MCC communicate on a bi-directional F-bus (or multiple unidirectional F-busses). The packet transmit path is from the PHY/MAC to the processor, then from the processor to the MCC and out the mesh. The processor does Layer 3 and Layer 4 look-ups in the FIPP to determine the packet's destination and Quality of Service (QoS), modifies the header as necessary, and prepends the MCC tag to the packet before sending it to the MCC.

The packet receive path is from the mesh to the MCC and on to the processor, then from the processor to the MAC/Phy and out the channel. The processor strips off the MCC tag before sending the packet on to the MAC.

A first data flow control mechanism in the present invention takes advantage of the duplex pair configuration of the connections in the backplane and connections to the modules. The MCCs have a predetermined fullness threshold for the FIFOs. If a receive FIFO fills to the predetermined threshold, a code is transmitted over the transmit channel of the duplex pair to stop sending data. The codes are designed to direct-couple balance the signals on the transmission lines and to enable the detection of errors. The codes in the present implementation of the invention are 16B/20B codes, however other codes may be used within the scope of the present invention. The MCC sends an I1 or I2 code with the XOFF bit set to turn off the data flow. This message is included in the data stream transmitted on the transmit channel. If the FIFO falls below the predetermined threshold, the MCC clears the stop message by sending an I1 or I2 code with the XOFF bit cleared. The efficient flow control prevents low depth FIFOs from overrunning, thereby allowing small FIFOs in ASICs, for example, 512 bytes, to be used. This reduces microchip costs in the system.

Figure 10:
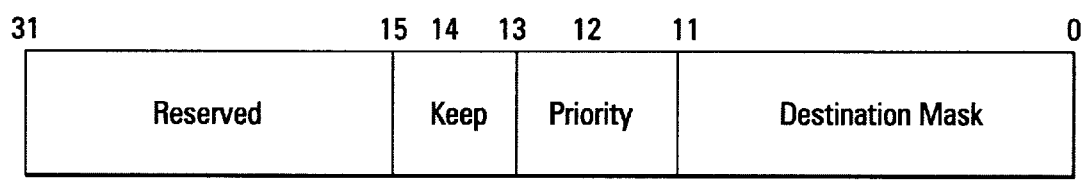
FIG. 10 is a diagram of a packet tag.

FIG. 10 shows a packet tag, also called the MCC tag. The MCC tag is a 32-bit tag used to route a packet through the backplane mesh. The tag is added to the front of the packet by the slot processor before sending it to the MCC. The tag has four fields: a destination mask field, a priority field, a keep field, and a reserved field. The destination mask field is the field holding the mask of slots in the current chassis to which the packet is destined, which may or may not be the final destination in the system. For a transmit packet, the MCC uses the destination mask to determine which transmit queue(s) the packet is destined for. For a receive packet the MCC uses the priority and keep fields to determine which packets to discard in an over-committed slot. The reserved field is unused in the current embodiment of the invention.

The MCC has two independent transmit mode selectors, slot-to-channel mapping and virtual transmit mode. In slot-to-channel mapping, the MCC transparently maps SIDs to CIDs and software does not have to keep track of the mapping. In virtual transmit mode, the MCC handles multicast packets semi-transparently. The MCC takes a single F-bus stream and directs it to multiple channels. The transmit ports in the MCC address virtual transmit processors (VTPs) rather than slots. The F-bus interface directs the packet to the selected virtual transmit processor. The VTP saves the Destination Mask field from the MCC tag and forwards the packet data (including the MCC tag) to the set of transmit queues indicated in the Destination Mask. All subsequent 64-byte "chunks" of the packet are sent by the slot processor using the same port ID, and so are directed to the same VTP. The VTP forwards chunks of the packet to the set of transmit queues indicated in the Destination Mask field saved from the MCC tag. When a chunk arrives with the EOP bit set, the VTP clears its destination mask. If the next chunk addressed to that port is not the start of a new packet (i.e., with the SOP bit set), the VTP does not forward the chunk to any queue.

The destination mask of the MCC tag enable efficient multicast transmission of packets through "latching." The destination mask includes code for all designated destination slots. So, if a packet is meant for all twelve slots, only one packet need be sent. The tag is delivered to all destinations encoded in the mask. If only a fraction of the slots are to receive the packet, only those slots are encoded into the destination mask.

The MCC maintains a set of "channel busy" bits which it uses to prevent multiple VTPs from sending packets to the same CID simultaneously. This conflict prevention mechanism is not intended to assist the slot processor in management of busy channels, but rather to prevent complete corruption of packets in the event that the slot processor accidentally sends two packets to the same slot simultaneously. When the VTPs get a new packet, they compare the destination CID mask with the channel busy bits. If any channel is busy, it is removed from the destination mask and an error is recorded for that CID. The VTP then sets all the busy bits for all remaining destination channels and transmits the packet. When the VTP sees EOP on the F-bus for the packet, it clears the channel busy bits for its destination CIDs.

The F-bus interface performs the I/O functions between the MCC and the remaining portion of the application module. The application module adds a 32-bit packet tag (MCC tag), shown in FIG. 10, to each data packet to be routed through the mesh.

The data received or transmitted on the F-bus is up to 64 bits wide. In data transmission, the F-bus interface adds 4 status bits to the transmit data to make a 68-bit data segment. The F-bus interface drops the 68-bit data segment into the appropriate transmit FIFO as determined from the packet tag. The data from a transmit FIFO is transferred to the associated data compressor where the 68-bit data segment is reduced to 10-bit segments. The data is then passed to the associated serializer where the data is further reduced to a serial stream. The serial stream is sent out the serial link to the backplane.

Data arriving from the backplane comes through a serial link to the associated channel. The serializer for that channel expands the data to a 10-bit data segment and the associated data expander expands the data to a 68-bit data segment which is passed on to the related FIFO and then from the FIFO to the F-bus interface.

A Fast IP Processor (FIPP) is provided with 32/64 Mbytes of high-speed synchronous SDRAM, 8 Mbytes of high-speed synchronous SRAM, and boot flash. The FIPP has a 32-bit PCI bus and a 64-bit FIFO bus (F-bus). The FIPP transfers packet data to and from all F-bus-connected devices. It provides IP forwarding in both unicast and multicast mode. Routing tables are received over the management bus from the chassis route server. The FIPP also provides higher layer functions such as filtering, and CoS/QoS.

Each line card has a clock subsystem that produces all the clocks necessary for each card. This will lock to the reference clock provided by the System Clock and Management Bus Arbitration Card.

Each card has hot-plug, power-on reset circuitry, and Sanity Timer functions. All cards have on-board DC-to-DC converters to go from the −48V rail in the backplane to whatever voltages are required for the application. Some cards (such as the CMTS card) likely will have two separate and isolated supplies to maximize the performance of the analog portions of the card.

FIG. 11 shows a generic switch header for the integrated switch. The header is used to route data packets through the system. The final destination may be either intra-chassis or inter-chassis.

The header type field indicates the header type used to route the packet through the network having one or more chassis systems. Generally, the header type field is used to decode the header and provide information needed for packet forwarding. Specifically, the header type field may be used to indicate that the Destination Fabric Interface Address has logical ports. The header type field is also used to indicate whether the packet is to be broadcast or unicast. The header type field is used to indicate the relevant fields in the header.

The keep field indicates whether a packet can be dropped due to congestion.

The fragment field indicates packet fragmentation and whether the packet consists of two frames.

The priority field is used to indicate packet priority.

The encap type field is a one bit field that indicates whether further layer 2 processing is needed before the packet is forwarded. If the bit is set, L2 is present. If the bit is not set, L2 is not present.

The Mcast type field is a one bit field that indicates whether the packet is a broadcast or multicast packet. It may or may not be used depending on the circumstances.

The Dest FIA (Fabric Interface Address) type field indicates whether the destination FIA is in short form (i.e., <chassis/slot/port>) or in long form (i.e., <chassis/slot/port/logical port>). This field may or may not be used depending on the circumstances. This field may be combined with the header type field.

The Src FIA type field is a one bit field that indicates whether the source FIA is in short form (i.e., <chassis/slot/port>) or in long form (i.e., <chassis/slot/port/logical port>). This field may or may not be used depending on the circumstances. This field may be combined with the header type field.

The data type field is an x-bit field used for application to application communication using the switch layer. The field identifies the packet destination.

The forwarding info field is an x-bit field that holds the Forwarding Table Revision is a forwarding information next hop field, a switch next hop, that identifies which port the packet is to go out, along with the forward_table_entry key/id.

The Dest FIA field is an x-bit field that indicates the final destination of the packet. It contains chassis/slot/port and sometimes logical port information. A chassis of value 0 (zero) indicates the chassis holding the Master Agent. A port value of 0 (zero) indicates the receiver of the packet is an application module. The logical port may be used to indicate which stack/entity in the card is to receive the packet. All edge ports and ICL ports are therefore "1"-based.

The Src FIA field is an x-bit field that indicates the source of the packet. It is used by the route server to identify the source of incoming packets.

Figure 12:
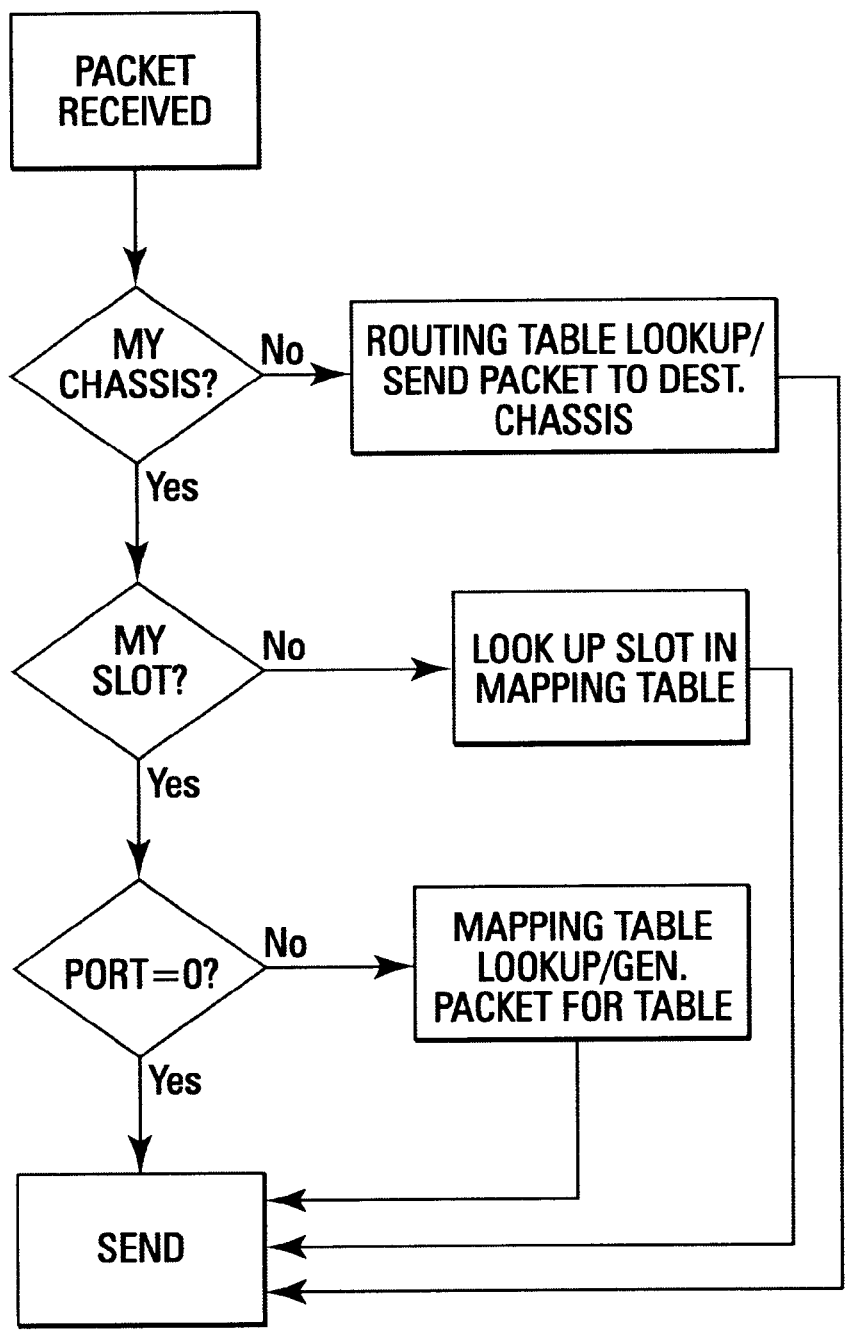
FIG. 12 is a flow chart of data transmission through the backplane.

FIG. 12 is a flow chart of the general packet forwarding process. When a packet is received at one of the application modules of the switch, the module examines the BAS header, if one is present, to determine if the packet was addressed for the chassis to which the module is attached. If not, the application module looks up the destination chassis in the routing table and forwards the packet to the correct chassis. If the packet was addressed for the chassis, the application module examines the header to determine whether the packet was addressed to the module (or slot). If not, the application module looks up the destination slot in the mapping table and forwards the packet to the correct application module. If the packet was addressed to the application module, the application module compares the forwarding table ID in the header to the local forwarding table revision. If there is a match, the module uses the pointer in the header to forward the packet on to its next destination.

Unicast Traffic Received from an ICL Port

Figure 13:
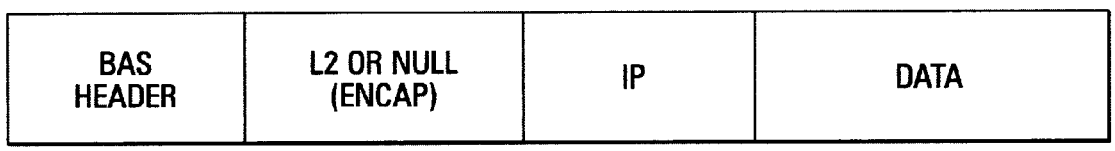
FIG. 13 is a block diagram of an incoming ICL packet.

FIG. 13 is a diagram of an incoming ICL packet. The packet has a BAS header, an encap field that may be either set or not (L2 or NULL), an IP field, and a data field for the data.

FIG. 14 is a diagram of a header for the packet of FIG. 12. The header type may be 1 or 2. A header type of 1 indicates an FIA field that is of the format chassis/slot/port both for destination and source. A header type of 2 indicates an FIA field of the format chassis/slot/port/logical port for both destination and source. The keep field is not used. The priority field is not used. The fragment field is not used. The next hop filed is not used. The Encap field is zero or 1. The Mcast field is not used. The DST FIA type may be 0 or 1. The SRC FIA type may be zero or one. The BAS TTL field is not used. The forward info field is used. And the DST and SRC FIA fields are used.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A process for switching data flow from one of a plurality of data communication application modules in a chassis interconnected across a backplane in said chassis, said process comprising the steps of:

A) receiving data at a one of said modules;

B) applying said data m bits at a time to an m-bit-wide parallel bus, where m is greater than one;

C) determining on which port of said one of said modules said data is to be transmitted, said port being directly connected through said backplane to another one of said modules to which said data is to be directed;

D) appending a tag to said data to indicate on which port said data is to be transmitted;

E) gating said m bits of data into a channel associated with said transmitting port;

F) transmitting said data from said transmitting port across said backplane to said other one of said modules to which said data is to be directed; and G) providing control data for the receiving and transmitting data over a bus, wherein the bus is connected to each of the plurality of data communication application modules and a chassis control module.

2. The process of claim 1 further comprising the step of serializing said m bits of data before transmitting said data.

3. The process of claim 1 wherein said data is transmitted on a differential pair of connections.

4. The process of claim 1 wherein said transmission is self-clocked.

5. The process of claim 1 wherein said process proceeds simultaneously with and independently of the same steps being taken in another of said modules.

6. The process of claim 1 wherein it is determined in step (C) that said data is to be multicast through multiple ports of said one of said modules, each of said multiple ports being directly connected through said backplane to another one of said modules to which said data is to be directed; the tag in step (D) indicates multicasting according to a mask indicating multicast transmitting ports; and steps (E)–(F) occurs simultaneously for each of said multicast transmitting ports.

7. A meshed backplane in a chassis for interconnecting N data communication application modules for data communication between them with N greater than 2, said meshed backplane comprising:

N(N−1) full-duplex serial links each connecting one of said N application modules with another with a minimum throughput of 64 kilobits per second;

at least two redundant management information buses each providing a connection to each application module and to at least two chassis control modules; and an embedded clock signal, wherein the data communication is self-clocked.

8. The backplane of claim 7 wherein each of said full-duplex serial links comprises one differential pair dedicated to transmission from one of said application modules to another and one differential pair dedicated to receiving to said one of said application modules.

9. The backplane of claim 7 further comprising a power distribution system.

10. The backplane of claim 7 further comprising a telephony mesh.

11. A data switch, comprising:

a backplane mesh organized as a plurality of slots to connect to a plurality of application modules, said backplane mesh providing an independent data path from each said slot to every other slot, said backplane mesh providing a loopback in each said slot;

a controller module having a routing table; and a bus connected to each said slot and said controller module, said bus providing control data for the data flow through the backplane mesh, whereby said independent data paths enable different types of data traffic to flow simultaneously through said data switch.

12. The data switch of claim 11 wherein each said slot has a slot ID.

13. The data switch of claim 11 further comprising:

at least one mesh communication chip (MCC) having a plurality of channels, said slots having a plurality of ports, each said channel in said MCC linking to a port.

14. The data switch of claim 13 further comprising:

a slot ID for each said slot; and, means for said MCC to transmit said slot ID, whereby flexible routing of said backplane is enabled.

15. The data switch of claim 13, wherein said MCC further comprises:

a plurality of FIFOs, one FIFO for each channel;

means for receiving a packet having a destination mask;

means for reading said destination mask;

means for copying said packet to appropriate ones of said plurality of FIFOs in response to said destination mask, whereby said packet may be substantially simultaneously transmitted over a plurality of channels.

16. A method for flexibly routing a backplane, comprising steps of:

providing a backplane mesh organized as a plurality of slots to connect to a plurality of application modules;

providing each said slot with a slot ID;

reading, upon insertion of each said plurality of application modules into a slot of said plurality of slots, ID of said slot;

transmitting from each inserted application module the slot ID of the slot to which said application module is connected;

building a routing table in response to each said transmitted slot ID, whereby said backplane may be flexibly routed; and building a mapping table in each said application module, wherein each mapping table is a subset of the routing table.

17. The method of claim 16 further comprising the step of controlling differential line impedance and length whereby signal integrity is maintained and high speed operation is enabled.

* * * * *